G. HILL.
OLIVE PICKER.
APPLICATION FILED MAY 28, 1914.
1,131,240.
Patented Mar. 9, 1915.
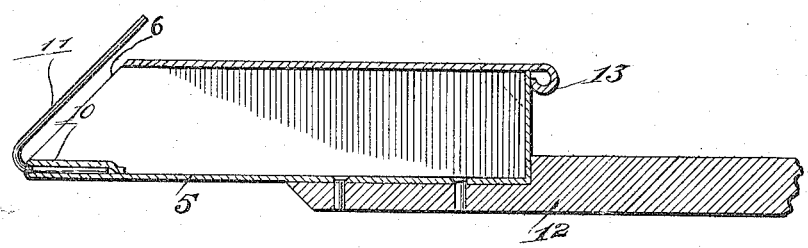
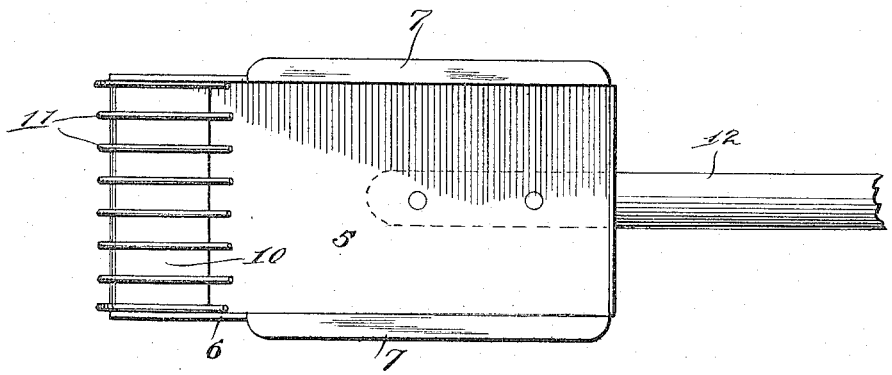
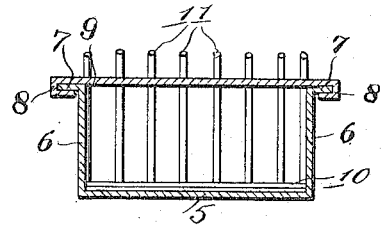

UNITED STATES PATENT OFFICE.

GEORGE HILL, OF ARLINGTON, IOWA.

OLIVE-PICKER.

1,131,240.

Specification of Letters Patent.

Patented Mar. 9, 1915.

Application filed May 28, 1914. Serial No. 841,578.

*To all whom it may concern:*

Be it known that I, GEORGE HILL, a citizen of the United States, residing at Arlington, in the county of Fayette and State of Iowa, have invented certain new and useful Improvements in Olive-Pickers, of which the following is a specification.

This invention relates to olive pickers, one of the objects being to associate a receptacle with the picker fingers in which the olives are permitted to accumulate during the picking operation and from which they are readily dispensed.

Another object of the invention is the peculiar manner in which the picking fingers are secured to the receptacle, so as to provide an efficient, yet durable device and one which is inexpensive to manufacture.

Other objects as well as the nature, characteristic features and scope of my invention will be more readily understood from the following description taken in connection with the accompanying drawings and pointed out in the claims forming a part of this specification.

Referring to the drawings: Figure 1 is a longitudinal sectional view of the picker constructed in accordance with my invention, Fig. 2 is a top plan view of the same showing the closure removed, and Fig. 3 is a transverse sectional view of Fig. 1.

In the drawings wherein is illustrated the preferred embodiment of this invention, a receptacle 5 is provided, which in the present instance is formed from metal, although any other suitable material may be used, if so desired, one of the ends of said receptacle being closed, the opposite end being open, as shown to advantage in Fig. 1. The open end has the opposite sides thereof inclined, as indicated at 6, shown to advantage in Fig. 1 for facilitating the picking of the olives. The marginal edges of the sides of the receptacle are turned at right angles to the body, as indicated at 7, to provide guides, which are engaged with complemental portions 8, which are formed on the marginal sides of the closure 9. One end of the bottom of the receptacle is extended and provided with a plurality of openings therein adjacent its terminal through which the picker fingers 11 engage. The end 10 is reversely folded on the fingers 11 so as to prevent the displacement of the latter, while the extreme end of the extended portion 10 is soldered or otherwise secured to the upper face of the bottom of the receptacle.

Each of the fingers 11 is preferably made from a single strand of wire, one end of which is engaged beneath the extended portion 10 as previously pointed out, while the opposite end is turned in angled relation to the body to provide a substantially V-shaped member, the free end of which is extended so as to lie above the plane of the closure 9, thereby facilitating its engagement with the olives on the limb of the tree. If desired, the ends of the fingers 11 which are engaged beneath the extended portion 10 may be soldered or otherwise secured thereto, in order to positively prevent their displacement when undue pressure is exerted thereon. In order to manipulate the device, a handle 12 is connected to the bottom of the receptacle 5, the latter being of any desired form and being secured to the receptacle by rivets or any other suitable securing means.

In use, the fingers 11 are raked over the olives on the tree, so as to pluck the same therefrom, the olives being permitted to drop into the receptacle 5, as soon as they are severed from the limb and may be readily removed therefrom by disengaging the closure 9 from the receptacle, said closure being provided with an operating portion 13, which is formed by looping one of the ends thereof, as shown to advantage in Fig. 1.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention, what I claim as new and desire to secure by Letters Patent is:

1. An olive picker including a receptacle, fingers carried by the receptacle, one end of said receptacle being extended, reversely folded and provided with a plurality of openings through which said fingers engage, said reversely folded portion engaging the inner terminal of the fingers to prevent their displacement.

2. An olive picker including a receptacle, the bottom of which is extended, picking fingers associated with the receptacle, the inner terminal of each engaging through a complemental opening in said extended portion, the extended portion being reversely folded on the fingers to retain the latter from displacement.

3. An olive picker including a receptacle, one end of which is closed and the opposite end open, fingers in connection with the open end and reversely folded to extend above the receptacle, and a closure detachably associated with the top of the receptacle to permit dispensing of the contents thereof.

4. An olive picker including a receptacle, the sides of which are turned at right angles to the bottom to provide guide flanges, one end of said receptacle being closed and the opposite end open, the terminals of the sides of said receptacle being inclined, fingers associated with said open end, the bottom of said receptacle being extended at said open end and reversely folded upon the inner terminals of said fingers for preventing the displacement of the latter, and a closure slidably engaged with said guide flanges.

In testimony whereof I affix my signature in presence of two witnesses.

GEORGE HILL.

Witnesses:
E. J. ENGELDINGER,
H. P. YOUNG.

Copies of this patent may be obtained for five cents each, by addressing the "Commissioner of Patents. Washington, D. C."